United States Patent [19]

Compton

[11] Patent Number: 5,467,588
[45] Date of Patent: Nov. 21, 1995

[54] FLUID FILLED SHAKER PAD FOR A TREE SHAKING HARVESTER

[76] Inventor: Ira Compton, 2434 Dayton Rd., Chico, Calif. 95928

[21] Appl. No.: 377,098

[22] Filed: Jan. 23, 1995

[51] Int. Cl.$^6$ ............................................. A01D 46/26
[52] U.S. Cl. ............................................ 56/340.1; 56/328.1
[58] Field of Search ....................... 56/340.1, 328.1, 56/DIG. 9, DIG. 24; 294/88, 103.1, 149

[56] References Cited

U.S. PATENT DOCUMENTS

| | | | |
|---|---|---|---|
| 3,318,629 | 5/1967 | Brandt, Jr. | 56/340.1 X |
| 3,335,556 | 8/1967 | Edgemond, Jr. | 56/340.1 |
| 3,414,314 | 12/1968 | Martin | 56/340.1 X |
| 3,479,806 | 11/1969 | Pool et al. | 56/340.1 |
| 3,596,972 | 8/1971 | Pool | 56/340.1 X |
| 4,064,683 | 12/1977 | Tennes et al. | 56/340.1 |
| 4,521,468 | 6/1985 | Brandt | 56/340.1 X |
| 4,757,674 | 7/1988 | Compton | 56/340.1 |
| 4,893,458 | 1/1990 | Compton | 56/340.1 |
| 4,932,195 | 6/1990 | Compton | 56/340.1 |
| 4,986,065 | 1/1991 | Compton | 56/340.1 |
| 5,406,780 | 4/1995 | Laserson et al. | 56/340.1 |

*Primary Examiner*—Stephen J. Novosad

[57] ABSTRACT

A flexible main shaker pad with an inexpensive and environmentally safe filler. The pad to be used in opposing pairs, one pad placed on each opposite side of a tree trunk or branch and supported by shaker arms of a tree trunk shaking harvester. The pad is constructed of flexible rubbery material, and is a thin-walled hollow pad having a large sealed interior chamber substantially full of fluid. The pad is preferably elongated to span the diameter of a tree trunk. The chamber is accessible through a removable plug in an end wall of the pad. The fluid within the chamber is preferably substantially water. The water filler is highly fluid, and non-compressible, and these characteristics aid in providing a pad which is flexible and conformable about a tree trunk, and which is not subject to excessive crushing and deformation under normal clamping pressures associated with tree shaking to dislodge fruit. The thin-walled pad filled with water does not internally generate any appreciable degree of heat, and thus operates at a relatively low temperature.

6 Claims, 6 Drawing Sheets

FLUID FILLED SHAKER PAD FOR A TREE SHAKING HARVESTER

BACKGROUND OF THE INVENTION

1. Field of the Invention

This invention relates to shaker pads on nut and fruit tree shakers used in large scale commercial harvesting for shaking tree trunks to dislodge the fruit.

2. Description of the Prior Art

Over the years the agricultural industry has developed equipment which quickly harvests (dislodges) the fruit of entire trees. One type of fruit and nut tree harvester which is applicable to the present invention and which is now widely used has two extending mechanical shaker arms which project outward from the side or front of the harvester. The powered movable shaker arms are designed to part under controllable power and then close to temporarily clamp against the trunk of the tree or on a large limb, whereat the two shaker arms oppose one another on each side of the tree or large branch. The shaker arms are then mechanically vibrated to shake the tree or branch and thus the fruit or nuts out of the tree. Modern tree shakers of this nature are self-propeller drivable vehicles having engines and steering equipment to allow a human operator to ride in the vehicle from tree to tree to shake each tree and dislodge the fruit in an orchard. One example of the many applicable styles of drivable tree trunk shaker harvesters is taught in my U.S. Pat. No. 4,986,065 issued Jan. 22, 1991, which is herein incorporated for essential and non-essential material, primarily for the information pertaining to the self-powered drivable shaker vehicle having two opposing powered shaker arms including shaker pads. The main pads or shaker pads of the harvester of reference U.S. Pat. No. 4,986,065 are single elongated pads horizontally disposed and of a length sufficient to span the tree trunk diameter and wrap substantially around the trunk, as will be further described. It is fastest and thus most economical to apply the shaker arms clamped against the trunk of the tree, thereby eliminating the time consuming process of clamping against individual limbs of the tree to shake individual limbs one at a time. By clamping against the tree trunk, only one clamping and shaking operation is required, and this is much faster than shaking individual limbs. Tree shaking harvesters have been developed and put into wide use which are sufficiently powerful in clamping and shaking ability to be able to grasp a tree trunk and shake the entire tree sufficiently to dislodge essentially all of the fruit or nuts. However, with extremely large and mature trees, such as pecans, pistachios or walnuts for example, tree trunk shakers such as taught in U.S. Pat. No. 4,986,065 are equipped with movable joints and shaker arms which may be elevated, and are applied to individual main limbs of the trees, although the shaker harvesters are in fact designed and built primarily for trunk clamping and shaking. Such trunk clamping and shaking harvesters, because they are structured primarily for clamping against a single relatively large diameter vertically oriented tree trunk, typically include shaker pads which are substantially elongated to span the diameter of the trunk, and are normally cylindrical so that a single elongated pad will be placed lengthwise perpendicularly against a trunk, and when under clamping pressure, deform and wrap about the trunk to a degree. The use of the single substantially elongated shaker pad on trunk shakers is now common place, wherein individual branch shakers typically have included multiple smaller circular pads per shaker head in the past. The use of single elongated shaker pads on each shaker head on modern trunk shakers, as opposed to multiple pivotally attached circular pads as were used in the past, is quite economical. It is less expensive to manufacture a single elongated pad compared to multiple smaller pads. Additionally, it is faster and thus more economical to mount a single elongated pad compared to multiple smaller pads. Additionally, as will be detailed, shaker pads even to this day continue to have significant problems associated with heat build up, and this requires rotation and changing out of the pads, which is clearly much easier with only one large pad per shaker arm compared to multiple pads on a shaker arm. Examples of shaker heads utilizing multiple smaller pads may be examined in U.S. Pat. Nos. 3,479,806 issued Nov. 25, 1969, and 3,596,972 issued Aug. 3, 1971, with the inventor of both of these patents being S. D. Pool. The Pool pads are not structured in a manner which would allow them to be rotated in order to have another side of the pad facing the tree, and this is a major shortcoming since heat will build on the tree facing side to a point of burning or melting the rubbery material unless shaking is performed on a slow basis, shaking few trees per hour, or shaking is periodically stopped to allow the pads to cool down. With modern elongated single pads as discussed above, the pads are loosely retained on the shaker arm by a retaining sling wrapped around the pad, and this loose retention allows the quick and easy manual rotation of the pad within the sling to face a cool side thereof toward the tree. Even if the pads did not get excessively hot, as in the case with the present pads, it is still a good idea to rotate the pads in the retaining sling to apply wear evenly and thus extend the life of the pads, much like that of rotating vehicle tires, and the retention of pads in a retaining sling as is most common today allows for easy rotation compared to bolted-on pads such as in the older Pool patents. However, the Pool pads are relevant to the present invention because they do include a sealed interior chamber having air, or liquid silicone, or air and liquid silicone within the chamber.

Thus, most if not all tree trunk shaker harvesters manufactured today utilize one elongated usually cylindrical shaker pad on each of the opposing shaker heads, with the shaker pad loosely retained in a retaining sling wrapped about the pad and removably bolted to the metal shaker arm. The elongated shaker pads are positioned on the shaker arm in a substantially horizontally disposed position, and this due to the vertical positioning of the tree trunk about which the two opposing shaker pads of the harvester are clamped. It is this type of shaker harvester to which the present invention is applicable. For the purposes of this disclosure, "fruit" includes citrus, plums, prunes, cherries, etc, and any of the many types of nuts which may be dislodged from trees by drivable shaker vehicles. This disclosure is directed toward improved shaker pads disposed between the metal end of the shaker arms and the tree; the pads being utilized to protect the tree and tree bark from being damaged. More particularly, the present invention is an improved substantially elongated shaker pad of the type utilized as a single horizontally disposed pad on each of the two opposing jaws of a drivable trunk shaking harvester.

The shaker heads, as they are commonly referred to in the industry, are the pads and pad retainers on the distal ends of the metal shaker arms. The shaker head of a modern tree trunk shaker normally includes a main shaker pad, a retaining sling, and a slip pad. The shaker pad itself is a relatively large elongated structure as described above, supported on the distal end of the metal shaker arm by the rectangular, somewhat thin flexible pad or sheet referred to as the retaining sling. A second rectangular flexible pad or sheet, commonly known as the slip pad, is attached to the upper surface of the shaker arm and draped downward over the exterior of the retaining sling. The lower or bottom side of the slip pad is releasably attached to the bottom surface of the shaker arm by elastic cords and hooks. The elastic cord attachment method of the slip pad allows the bottom of the pad to be unhooked and flipped upward onto the top of the shaker arm to expose the outer surface of the sling. Exposing the sling allows a heat resistant grease or lubricant to be applied between the sling and the slip pad to decrease the friction between the two pads during shaking. The grease allows the slip pad to remain substantially stationary against the tree while the movement of the vibrating shaker arm, shaker pad and retaining sling is isolated from the tree. Ideally, only vibrational waves or shock waves carry through the outer most layer (slip pad) to the tree so that the bark and delicate cambium layer of the tree is not damaged by movement. Even with the lubricant between the retaining sling and slip pad, friction is still present between the layers of padding and consequently heat is developed. Excessive heat in the main pad, retaining sling and slip pad will cause the deterioration of the padding, and depending upon the degree of heat build up, this can be relatively slow or it can be very quick. Badly deteriorated padding must be replaced due to the development of hard spots and cracks, or proper separation of the movement of the shaker head against the delicate cambium layers of the tree will be lost, leading to trees which die or are stunted. Clearly for understandable economic reasons, it is desirable to replace costly shaker head paddings as little as is possible.

During shaking, the vibrational movement of the main pad, which is under relative high compression, causes heat to be generated internally as the layers of the rubbery pad comprising the main pad rub and move against one another. Even if the main pad were to be made of a single integral piece of rubbery material, thus being absent the typical multiple layers similar to tire construction, the molecules of the single integral piece of rubbery material will be compressed and moved against one another, and thus internal heat will be generated. The main pad is the most expensive, compared to the retaining sling and slip pad. In order to achieve fast and adequate shaking without damaging a tree, a main pad must be reasonably soft so as to assist in not damaging the tree, as the pad is primarily for the purpose of separating the steel end of the shaker arm from the tree, of course vibration must also be transmitted to the tree. The main pad must also be capable of transferring vibration from its side against the metal shaker arm to the outer side which faces a tree. A main pad must be flexible and soft to a degree so as to be able to somewhat deform and wrap about a portion of the tree trunk or branch so that the trunk is somewhat trapped between the two opposing shaker heads, and this so as to be better able to transfer vibration to the tree. It is also desirable that a main pad be highly durable, and again, normally, heat build up is the primary cause of main pad failure.

In the prior art, main pads have been manufactured in various structural forms in attempts to achieve that which is required or desired of a main shaker pad, and all main pads of the past have shortcomings which ultimately lead to higher harvesting costs. Heat build up and durability have been the most significant problems associated with prior art main pads. Other than my liquid circulation cooled pads of my earlier patents which will be listed, prior art main pads have typically fallen into two general catagories. The first being the solid main pad category, and the second being the hollow main pad category. The solid type main pads have been manufactured in elongated rectangular form and cylindrical form. Solid pads, although often having a small diameter central bore lengthwise through the pad to allow some air circulation, are made of thick rubbery material and include no sealed internal chamber. Solid pads although used for many years have now substantially been replaced with what are believed to be improvements thereover, hollow main pads. Solid pads, being very thick walled or completely solid rubbery material develope heat from internal friction relatively quickly because of the large volume of rubbery material rubbing against itself. U.S. Pat. No. 3,335,556 issued Aug. 15, 1967 to J. W. Edgemond, Jr. for "Article Gripping Mechanism" teaches a shaker pad which is essentially a solid pad, although it does include very small interior chambers containing fluid lubricant.

Examples of hollow main pads are shown in U.S. Pat. No. 4,521,468 issued Jun. 4, 1985 to R. W. Brandt, and in U.S. Pat. No. 3,318,629 issued May 9, 1967 to R. W. Brandt, Jr. The Brandt, Jr. patent teaches a thin wall cylindrical main pad having an interior chamber of considerable size compared to the overall pad size. Within the chamber is granular material, such as coarse sand, metal particles or plastic bits. The granular materials are to prevent the pad from becoming collapsed or excessively deformed under the clamping pressures, but also because the granular material is fine and will flow to a degree, to allow for a degree of deformation about the tree trunk so as to allow for good vibrational transmission. U.S. Pat. No. 3,318,629 is herein incorporated by reference primarily for background information pertaining to the structure, use, advantages and disadvantage of hollow main shaker pads filled with granular material.

The Brandt U.S. Pat. No. 4,521,468 teaches a thin walled cylindrical main pad having an interior chamber of considerable size compared to the overall pad size, and one which is quite similar to the pad of U.S. Pat. No. 3,318,629. U.S. Pat. No. 4,521,468 is herein incorporated by reference primarily for background information pertaining to the structure, use, advantages and disadvantages of hollow main shaker pads filled with granular material. The filler or granular material used in the interior of the pads of U.S. Pat. No. 4,521,468 is a dry powder covered plastic rod or chip. The powder on the plastic rods or chips is a lubricant intended to reduce heat build up, and this patent indicates on going research into pad structures for tree shakers, and on going attempts to reduce heat build up.

Other flowable or granular materials which I know have been used as fillers in hollow shaker pads include ground walnut shells, small glass beads, sand of various sizes and plastic beads, all of which has been tried in an unlubricated and lubricated form. However, although hollow granular filled shaker pads generally provide improved deformability and vibration transfer over the solid shaker pads, heat build up remains a costly problem with granular filled pads because the granular material rubs against itself under the clamping and vibrational pressures, and thus generate heat.

As previously stated, problems associated with prior art main shaker pads are primarily durability and maintenance, although vibration transfer, excessive damage to trees, and initial manufacturing costs remain a problem for prior art padding arrangements. Due to continuous heat build up, mostly on the side of the pad facing the tree, prior art pads, whether solid or granular filled, require or would benefit from periodic rotation during harvesting wherein the side facing the tree is manually rotated 180 degree to be facing away from the tree. This rotation is performed every 30 to 60 minutes depending upon the rate or number of trees being shook per hour, and requires the operator to stop the vehicle and get out and manually rotate the pad in the retaining sling. A loss of production occurs each time the harvester is stopped. Additionally, also because of heat build up, the main pads should be temporarily removed and another set of pads placed on the harvester about every two hours, although this time period can vary. The changing of the pads is to allow the used pads to cool down. Although pad rotation and changing is not absolutely required, if one wishes his expensive pads, sling and slip pad to last any appreciable time, rotation and change out of the pads is economically wise with prior art pads even though production is lost when the harvester is shut down.

Even though rotation and changing out of the pads will greatly extend the pad life, and the pad will deteriorate with use mainly due to heat. Also subject to deterioration are the granular fillers used in hollow filled main pads. With the high clamping pressure and vibration, coupled with the build up of heat, the granular material will break into smaller pieces resulting in a less full more crushable pad, and the materials will often begin to clump, as opposed to being a relatively even flowable material (powder). With clumping of the granular materials, the pad begins to get hard spots or areas which will cause damage to a tree. Tree damage can be very expensive when a tree which took 5 to 10 years to grow into a profitable producing tree dies due to damage from a bad shaker pad. When filler clumping occurs, the pad must be removed and the filler taken out of the pad and sifted or replaced. Oftentimes the fillers which seem to function and hold up best are quite expensive, and so it would be desirable for such fillers to last a very long time. Under fast paced modern orchard harvesting with today's modern shakers and hollow filled pads, the granular material often needs to be removed from the pad and sifted or screened, or completely replaced in as few as 8 to 10 shaking hours, and these granular filler maintenance procedures are in the very least costly in terms of labor. In order to lengthen the life of the fillers, the pads can be rotated and changed out more often during the day, and this as mentioned earlier requires the stopping of the harvester and a resultant loss of production.

In attempts to solve the aforementioned shortcomings in prior art shaker pads, I have been experimenting and testing in this field for many years in an effort to provide improved structuring to reduce or eliminate the build up of heat within the shaker pads, retaining slings and slip pads of shaker heads in order to achieve increased durability and higher production in harvesting. One of my earlier inventions was patented on Jul. 19, 1988 under the name "Liquid Cooled Shaker Pad", U.S. Pat. No. 4,757,674. The shaker pad of this patent includes a circulating system of coolant through the main pad, either by gravity, convention or mechanical pump, which is forced or drawn through various channels within the shaker pad. The coolant is circulated through a cooling mechanism exterior of the pad prior to being returned to the pad. The pad of this patent is not a sealed pad, but includes fluid lines extending in and out of the pad, and although this pad structure functions well to reduce or eliminate heat build up in the pad, it is relatively costly to initially manufacture and requires maintenance of the lines and heat exchanger. The coolant lines are also somewhat exposed to possible damage during tree shaking. My U.S. Pat. No. 4,757,674 is herein incorporated by reference for both essential and non-essential material primarily relating to pad structure and use; pad retention on a shaker arm with a retaining sling, for the application of the slip pad on a self-propelled drivable tree shaking harvester, and for the information relating to the problems of heat build up in the shaker head during high speed commercial tree shaking.

Another patent was issued to me on Jan. 16, 1990 entitled "Liquid Cooled Shaker Pad Retaining Sling", U.S. Pat. No. 4,893,458. This invention includes a retaining sling for shaker pads provided with circulatory channels within or between the exterior walls of the pad retaining sling. The sling also has input and output ports and lines which communicate with a fluid circulating apparatus. The sling of this patent is not a sealed sling, but includes fluid lines extending in and out of the sling. My U.S. Pat. No. 4,893,458 is herein incorporated by reference for both essential and non-essential material primarily relating to pad structure and use; pad retention on a shaker arm with a retaining sling, for the application of the slip pad on a self-propelled drivable tree shaking harvester, and for the information relating to the problems of heat build up in the shaker head during high speed commercial tree shaking.

Another patent was issued to me on Jun. 12, 1990 entitled "Method And Apparatus For Cooling The Shaker Heads Of A Tree Shaking Harvester Machine", U.S. Pat. No. 4,932,195. This invention includes a generally closed circulatory system of tubing carrying liquid coolant between a first heat exchanger built into the shaker head and a second heat exchanger located remote of the first one. A coolant is circulated through the system and cools the shaker head. The first heat exchanger may be located in the main pad, the retaining sling or slip pad. My U.S. Pat. No. 4,932,195 is herein incorporated by reference for both essential and non-essential material primarily relating to pad structure and use; pad retention on a shaker arm with a retaining sling, for the application of the slip pad and grease on a drivable self-propelled tree shaking harvester, and for the information relating to the problems of heat build up in the shaker head during high speed commercial tree shaking.

Although the present field is relatively old and crowded, there is still a need for further improvement in the shaker heads of tree trunk shaking harvesters so that overall harvesting costs may be reduced.

SUMMARY OF THE INVENTION

The following detailed description is of best modes and preferred structures for carrying out the invention, and although there are changes which could be made to that which is specifically herein described and shown in the included drawings, for the sake of briefness of this disclosure, all of these changes which fall within the scope of the present invention have not herein been detailed, but will be apparent to those skilled in the art.

In practicing my invention I have developed an improved main shaker pad with pad filler. My pad is to be used in opposing pairs on a tree trunk shaking harvester, and as a single elongated horizontally disposed pad, one main pad per each of the two opposing shaker arms. "Main pad" or "pad" in this disclosure is referring to the pad which is primarily responsible for separating the steel end of the shaker arm from the tree, wherein the retaining sling and slip pads, although rubbery thin sheet material, primarily are for differing functional reasons other than padding as explained in the above prior art information.

The present pad is constructed of flexible rubbery material which may be natural, synthetic or a combination thereof, and is what is considered to be a thin-walled hollow pad having an accessible but normally sealed large interior chamber containing fluid. The preferred fluid is water or substantially of water, and in my thin-walled flexible pad the water is the filler material which allows conformability, good shock or vibration transfer and greatly reduced internal heat generation while preventing the pad from collapsing. Although the pad is constructed of flexible material, the degree of flexibility when filled with water is not so high as to allow the pad to be crushed under the clamping pressures to a point where the pad would no longer serve as a tree protecting pad, or would no longer provide good vibration transfer. The pad, although flexible, and preferably slightly expandable, provides a containment vessel for the incompressible fluid (water) which limits compression or deformation of the pad via reaching the maximum expansion ability of the pad at normal clamping pressures, at which point the pad is conformed to the tree trunk, and is a proper firmness to transmit vibration through the confined water and pad rubber to the tree. The degree of flexibility and deformability is also such that the pad provides very good padded protection to the tree trunk. The thin-walled pad filled with water does not generate any appreciable degree of heat, and therefore does not require rotation for heat related reasons; changing out for a cool down session, or the changing of the filler (water). Rotation of my pad every 10 to 24 hours of shaking time is a good idea for reasons of even wear, much like rotating a tire.

As a filler for the present pad, water seems to be ideal. With water as the filler, clumping never occurs. Additionally, I have found that liquids such as water, unlike granular fillers, do not generate any appreciable internal heat under the clamping and vibrational pressures and patterns associated with high volume, essentially non-stop commercial tree shaking. The present invention provides for an improved shaker pad which will substantially increase the rate of tree shaking over an extended period by reducing or eliminating the stopping of the harvester due to main pad related problems. The present pad is also expected to be much more long lived than prior art pads due to the substantial reduction in heat build up. Utilizing water as a filler in my pad is additionally very inexpensive and is readily available, when compared to some commercially available prior art "state-of-the-art" fillers which can cost as much as $100.00 U.S. dollars per pad fill, and are not available from any standard garden hose and spigot.

With the present invention the pad is sealed, although there is a filler access plug, and unlike some of my previous inventions, there are no hoses or lines to maintain or to be damaged. Additionally, when water is used as a filler, should one of the pads rupture for whatever reason, there is no threat to the environment, and this is not true of many of the prior art fillers which were silicone based or granular material heavily treated with toxic lubricants and fire retardant chemicals.

Further objects and advantages of my invention will be better understood with a reading of the remaining specification and review of the claims and accompanying drawings.

BEST MODES FOR CARRYING OUT THE INVENTION

Figure 1:
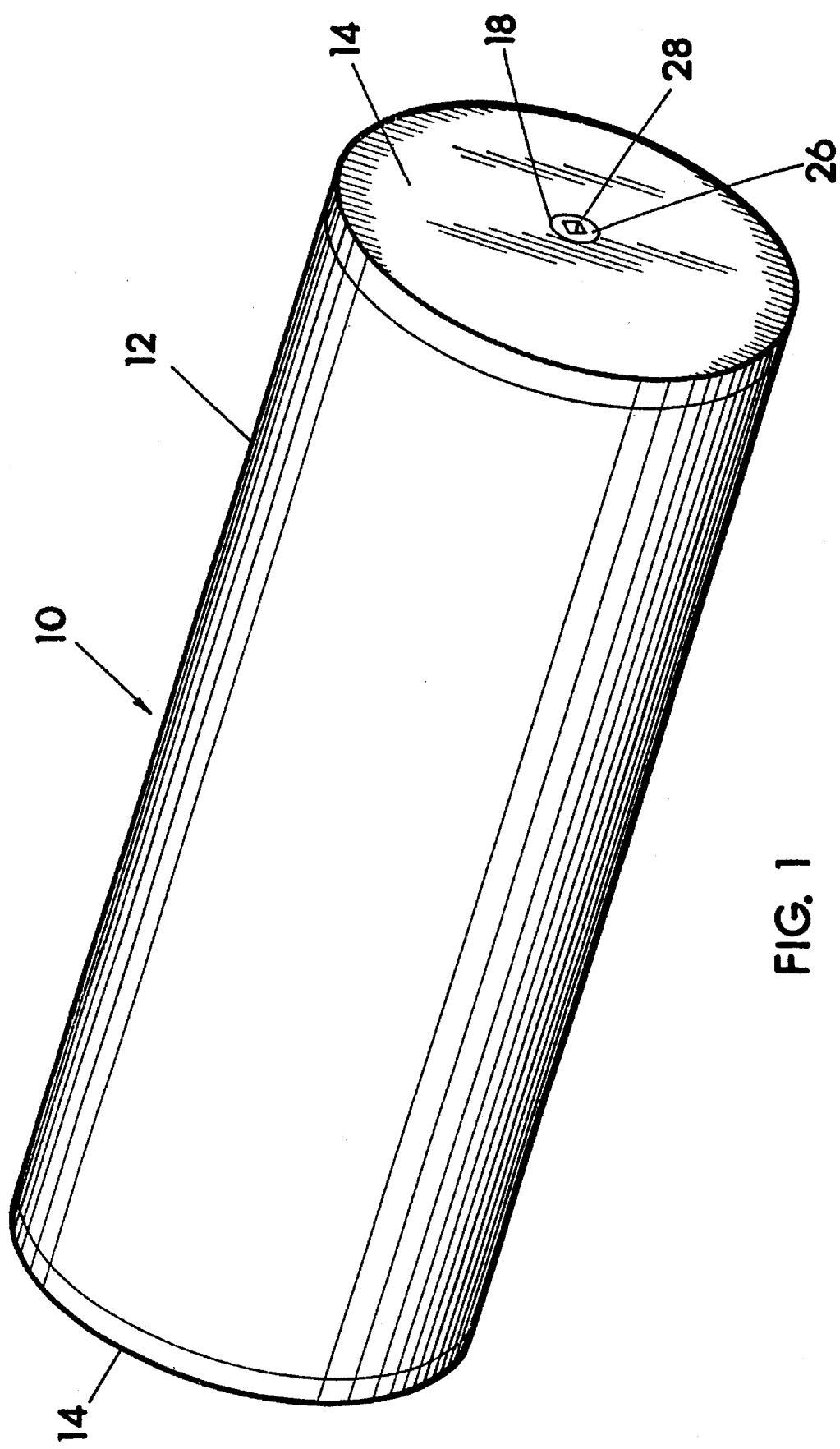
FIG. 1 is a perspective view of a liquid filled shaker pad in accordance with the present invention.
Figure 2:
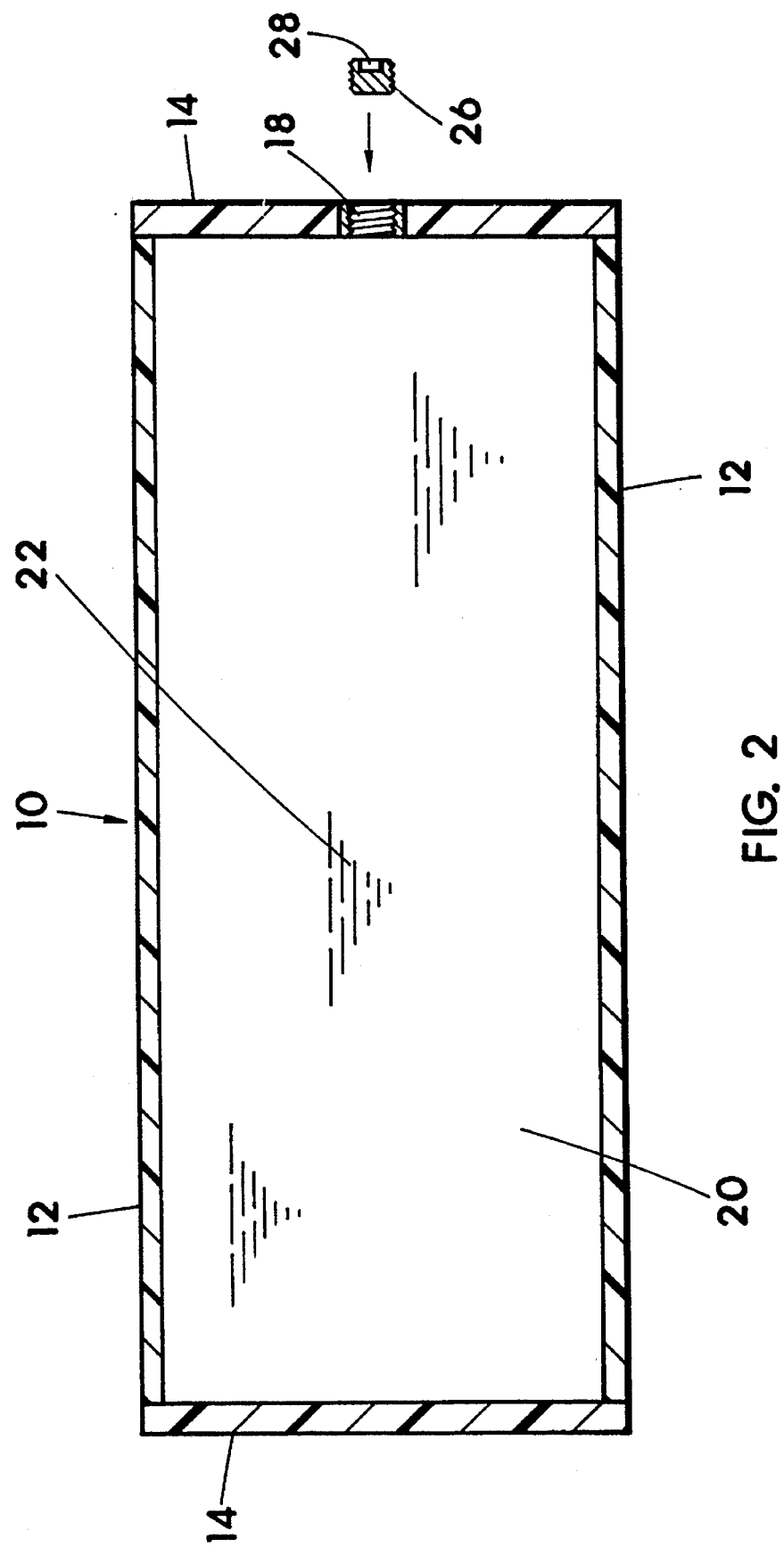
FIG. 2 is a cross-sectional side view of a liquid filled shaker pad showing the interior of the pad completely filled with liquid. This embodiment utilizes expandable or outward bendable end walls to allow for liquid displacement during clamping so the pad can deform and conform somewhat to the tree trunk.

The following detailed description is of best modes and preferred structures for carrying out the invention, and changes which fall within the scope of the present invention which will be apparent to those skilled in the art could be made to that described.

My liquid filled pad 10 is a low heat generating main pad being the primary pad of a shaker head assembly on an end of a shaker arm 34 of a vibratory tree trunk shaking harvester 40 for protecting bark layers of a tree 16 and for transmitting vibration to the tree 16 during tree shaking. Pad 10 is elongated and is horizontally disposed on the shaker arm 34 during use, and is at least 14 inches long so as to be capable of spanning across the diameter of at least small trees of a young orchard. The ideal overall pad 10 exterior dimensions in my opinion are about 8½ inches in diameter and 20 inches in length, and this is given for the benefit of the reader to be able to understand approximate scale, although this is for example only and I do not want my invention to be restricted to this since pad 10 could clearly be made larger or smaller in various combinations of dimensions. Normally pad 10 made about 20 inches in length is ideal, being capable of spanning the trunk diameter of even large trees 16, and being sufficiently long so as not to require time consuming perfect alignment of the pad 10 on a tree trunk. Pad 10 generally comprises an elongated annular main body wall 12 having two oppositely disposed ends with each of the ends sealingly capped by end walls 14, one end wall 14 affixed at each of the oppositely disposed ends of body wall 12. Body wall 12 is preferably made of laminations of durable rubbery material sheets made of either natural or synthetic elastomeric material having layers of durable woven fabric between the rubbery layers, with the layers vulcanized or adhered to form a single annular wall 12. Wall 12 is similar in its laminated construction to fabric reinforced tires. Main body wall 12 is defined of durable materials providing the wall with flexibly resilient characteristics so that the wall is flexible and resilient, being capable of deforming about a tree trunk many times without cracking, tearing or delaminating. Although wall 12 may be of a slightly stretchy and resilient nature, it cannot be excessively stretchy as it must in part serve to bound the liquid 22 within pad 10 so as to ensure an adequate degree of padding and good vibrational transfer as will be better understood with continued reading.

Figure 4:
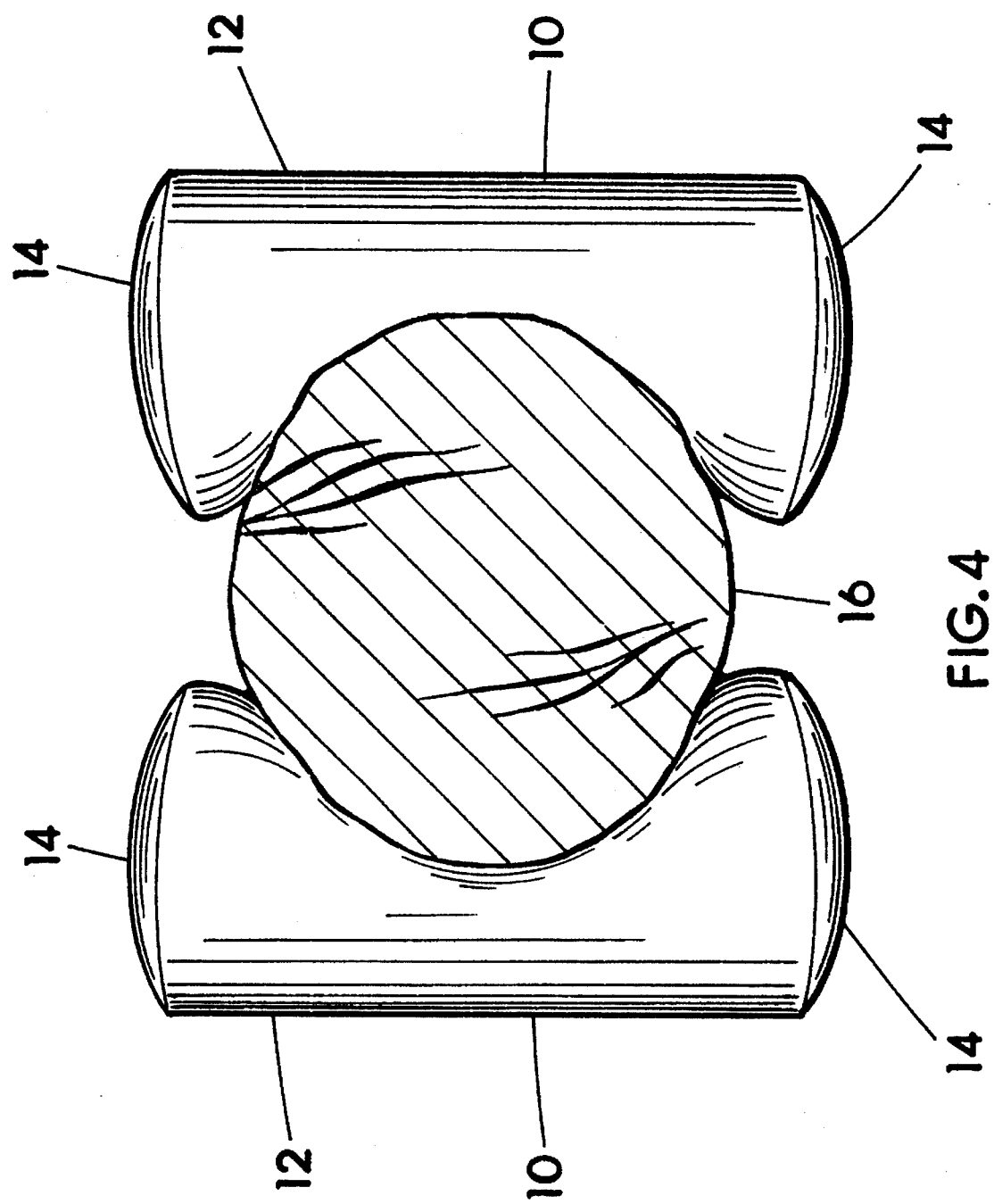
FIG. 4 is a top plan view of two liquid filled shaker pads in use clamping against a tree in accordance with the present invention. The tree is cross sectioned and extending vertically, and the two pads are shown lengthwise horizontally disposed. In this illustration, the shaker arms, the retaining slings and slip pads are not shown for the sake of clarity of that which is intended to be shown. The pads are shown slightly deformed and conforming to the trunk, and the end walls of the pads are shown bowed outward under the internal pressure created by the incompressible liquid under clamping pressure.
Figure 5:
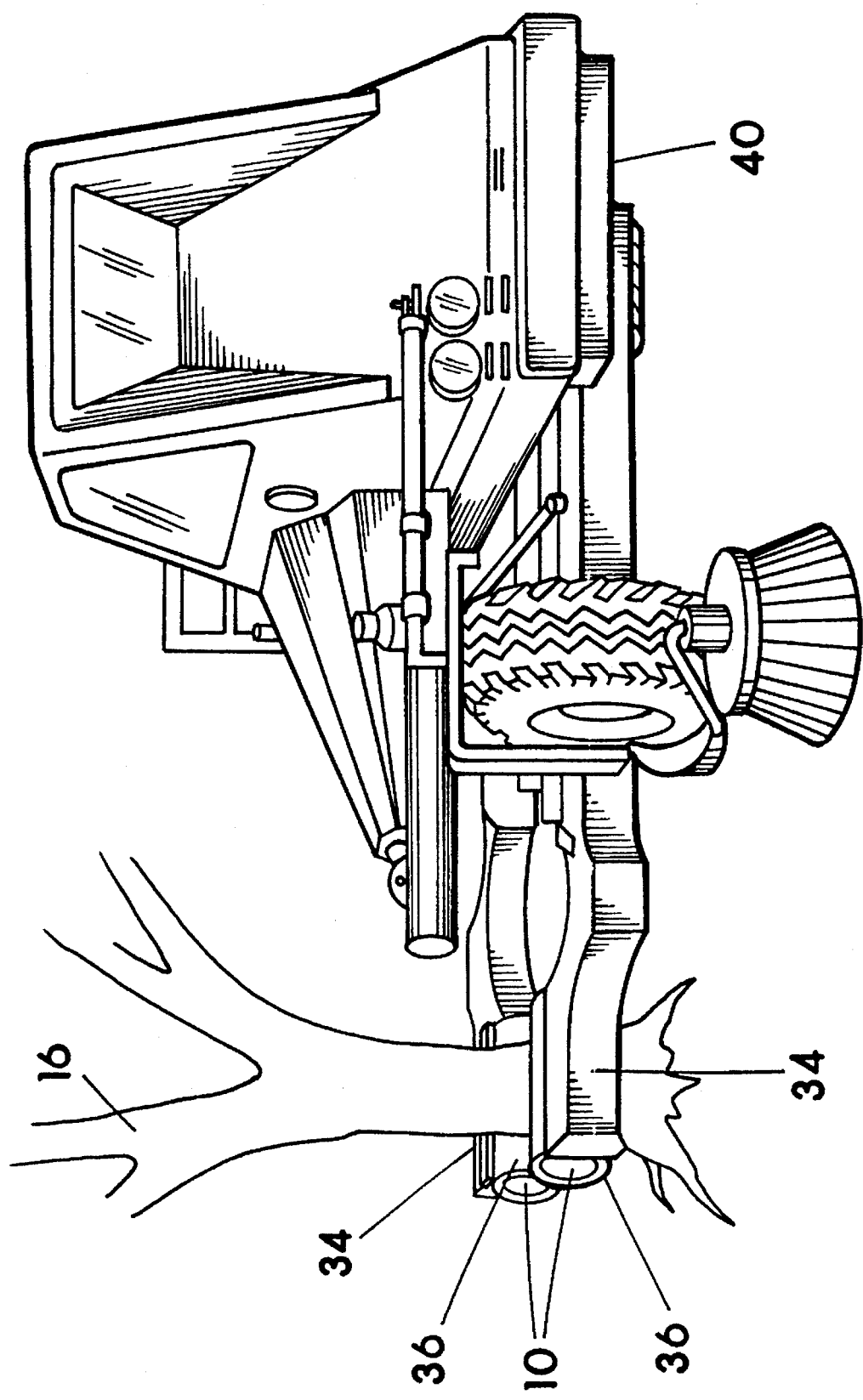
FIG. 5 illustrates my liquid filled shaker pads affixed to a drivable self-propelled shaker harvester and in the process of shaking a tree.
Figure 6:
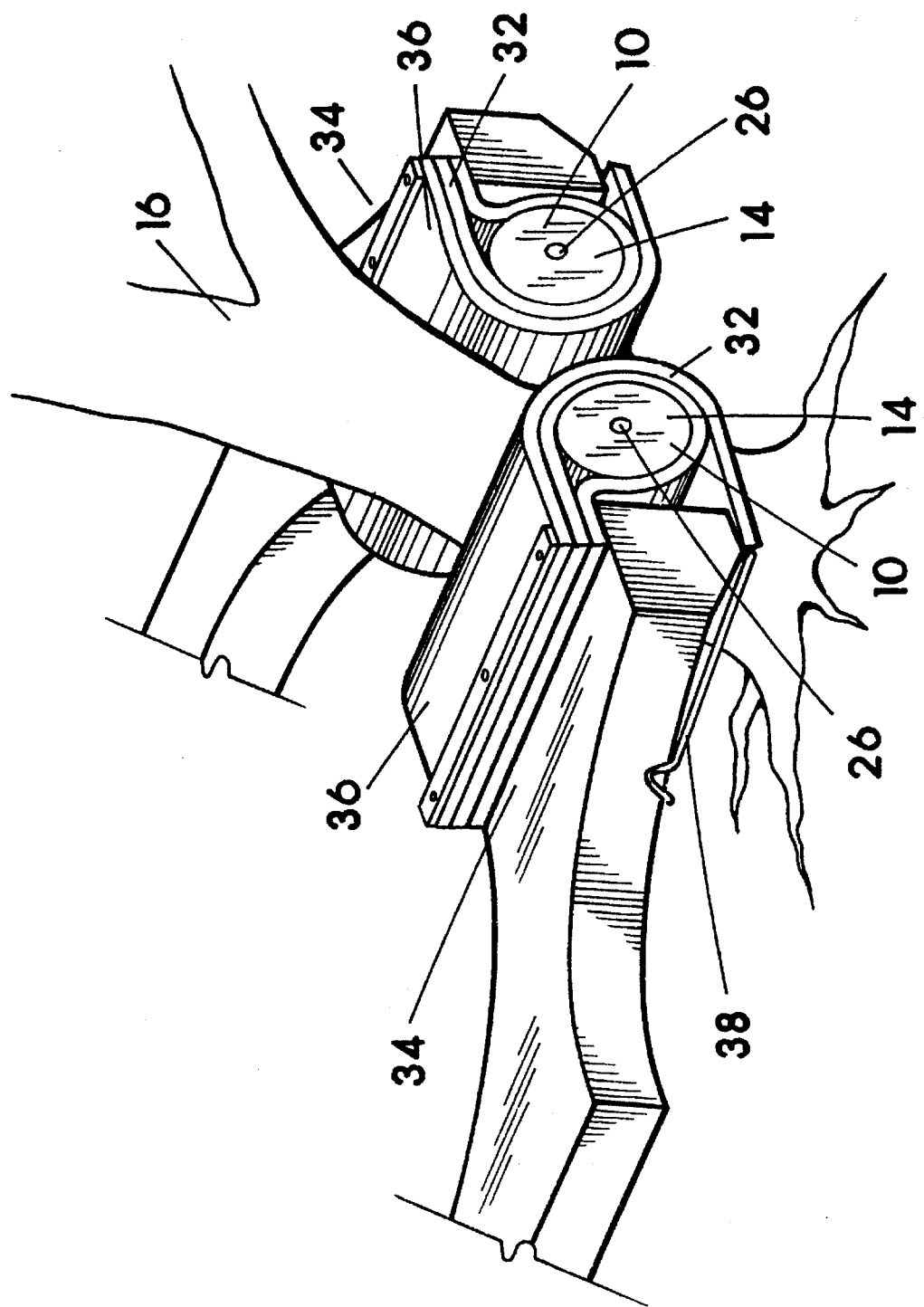
FIG. 6 illustrates my liquid filled shaker pads affixed to the shaker arms by retaining slings. Slip pads are shown over the retaining slings and directly against the tree.

End caps or end walls 14 are preferably made of laminations of the same materials as is main wall 12, and this assists in rendering the walls 14 adequately strong and heat bondable to the ends of walls 12. The connection of end walls 14 to main wall 12 may be achieved with heating and vulcanization, but regardless as to the specific affixment process utilized, must be a strong, preferably flexible affixment, and one which is liquid tight or sealed. End walls 14 are preferably defined of durable materials providing the end walls 14 with flexibly resilient characteristics, so that the walls 14 are flexible and resilient, being capable of deforming and bending or bowing outward under internal pressure so as to allow liquid within the pad 10 to be displaced with clamping pressures, and thus allowing pad 10 to deform to a degree and wrap to a degree about a tree trunk. End walls 14 if made flexible to allow outward bowing as may be seen in FIG. 4, must be made of materials and material thicknesses which will allow bowing many times without cracking, tearing or delaminating. In my testing, end walls 14 when allowed to flex with internal pressures, with a normal size pad full of incompressible liquid were only required to bow outward about 1 to 1½ inches at the center, and this degree of flexing or bowing is relatively easily achieved in a durable pad 10 structure of 8 or 9 inches in diameter.

Since internal heat is generated in rubbery material and laminations of such material, it is best to maintain body wall 12 and end walls 14 as thin as is possible while still providing adequate strength and durability, and the layers of woven fabric will assist in allowing these components to be made strong enough and thin, again, similar to tire construction. I have tested main wall 14 about 1 inch in thickness, and end walls about 1¼ inches thickness in a 8½ exterior diameter pad 10 which was about 20 inches in overall length with quite good results. These dimensions are given for example only and I do not want to be restricted thereto since they could be altered considerably with the scope of the invention, however, the principle is to use thin walls which will generate little internal heat due to their thinness, and provide a substantially large interior chamber 20 which is almost as large as the overall pad 10 size and then put a liquid 22 within the chamber 20 which will not generate any appreciable internal heat with the pressures of clamping and vibration associated with tree trunk shaking.

Although wall 12 may be of a slightly stretchy and resilient nature, it cannot be excessively stretchy as it must in part serve to bound the liquid within pad 10 so as to ensure an adequate degree of padding and good vibrational transfer, and this is also true of end walls 14, because if they were too elastic, the liquid within chamber 20 would not come under sufficient pressure to prevent further deformation of the pad 10 prior to the pad 10 being fully inwardly collapsed under the tree clamping pressures, and this would lead to insufficient padding leading to bark damages, and to poor vibration transfer to the tree because the pad at that point might be too flexible or not firm enough to transmit vibration well.

The sealed interior chamber 20 of pad 10 is defined between the end walls 14 and the main body wall 12. Although the chamber 20 could be varied in size based on pad 10 size and or wall 12 and 14 thickness, on a pad for trunk shaking, it would seem pointless to have a chamber 20 which had a cross-sectional diameter less than 50 percent of the cross-sectional exterior diameter of pad 10, since less than this would mean the pad had very thick walls 12 and or 14 which would generate substantial internal heat within the walls. I prefer the cross-sectional diameter of chamber 20 to be at least equal to 65 to 85 percent of the exterior cross sectional diameter of the pad 10, although I do not want my invention restricted precisely to this preferred range.

Preferably located in the center of one of the end walls 14, although it theoretically could be in main body wall 12, is a small access opening to allow putting liquid 22 into chamber 20 or taking it out. I install a rigidly affixed metal insert 18 which has a threaded bore through the center in one end wall 14 and affix the insert securely in place with the adhesion brought about during heat treating and vulcanizing of the material comprising the end wall 14. I use an insert 18 which includes an outward extending flange or ring (not shown) at what is considered toward the bottom end thereof, and the flange is imbedded between layers of the end wall 14 and aids in securing the insert in place. Insert 18 includes the central bore aligned with a bore through the end wall 14 to define a bore from exterior of the end wall leading into chamber 20. A threaded plug 26 having a square socket 28 for a sqaure drive wrench is utilized to sealingly plug the access opening insert 18. Plug 26 is removable, and could use a different type wrench socket such as a hexogonal socket. Pipe dope or sealing tape can be used to ensure no liquid leakage by the threads of insert 18 and plug 26. The access opening defined by insert 18 may be quite small since only liquid needs to be passed therethrough, and ¾ inch is large enough without significantly affecting the strength and or flexibility of the end wall 14.

Liquid 22 as previously mentioned is preferably water, which is non-compressible, non-toxic, readily available, not harmful to the environment, and it is of course very inexpensive. Water as liquid 22 also functions very well within pad 10. Although pure water can be used as liquid 22, in areas subject to freezing wherein the pads 10 may be exposed to low temperatures, a small amount of an environmentally safe anti-freeze liquid can be added to the water. An anti-fungus additive could also be added to slow or prevent the growth of fungus and mold in the pad. I prefer liquid 22 to be substantially comprised of water or pure water. Other liquids such as oils will work as liquid 22, but water functions so well, is so inexpensive and safe that there seems to exist insufficient reasoning for utilizing anything other than a liquid 22 substantially comprising water.

Because the opening through insert 18 is quite small and it is dark and thus difficult to see into pad 10, I recommend standing pad 10 on end with insert 18 up, plug 26 removed, and then to simply fill the pad 10 full of liquid 22. When the liquid reaches the insert 18, it will be visible, and the person filling the pad will know the pad is full enough. Although one could fill the pad 10 only partly with liquid 22, unless one measures the liquid or utilized a flash light, it would be difficult to know if the chamber 20 were full enough. Utilizing the concept of a full chamber 20 requires some area or space which the incompressable liquid must be able to move into if the pad 10 body wall 12 is going to deform partly and conform somewhat to the tree trunk during shaking. Therefore I use the outward bowing end walls 14 as discussed above. The bowing outward of the end walls 14 provides the fluid displacement area needed. The end cannot be so flexible that the pad 10 is too soft, as the pad wall 12 and end walls 14 must restrict or bound the liquid at some point, and that point is at the proper firmness and deformation of the pad during clamping and vibratory pressures associated with tree shaking.

Figure 3:
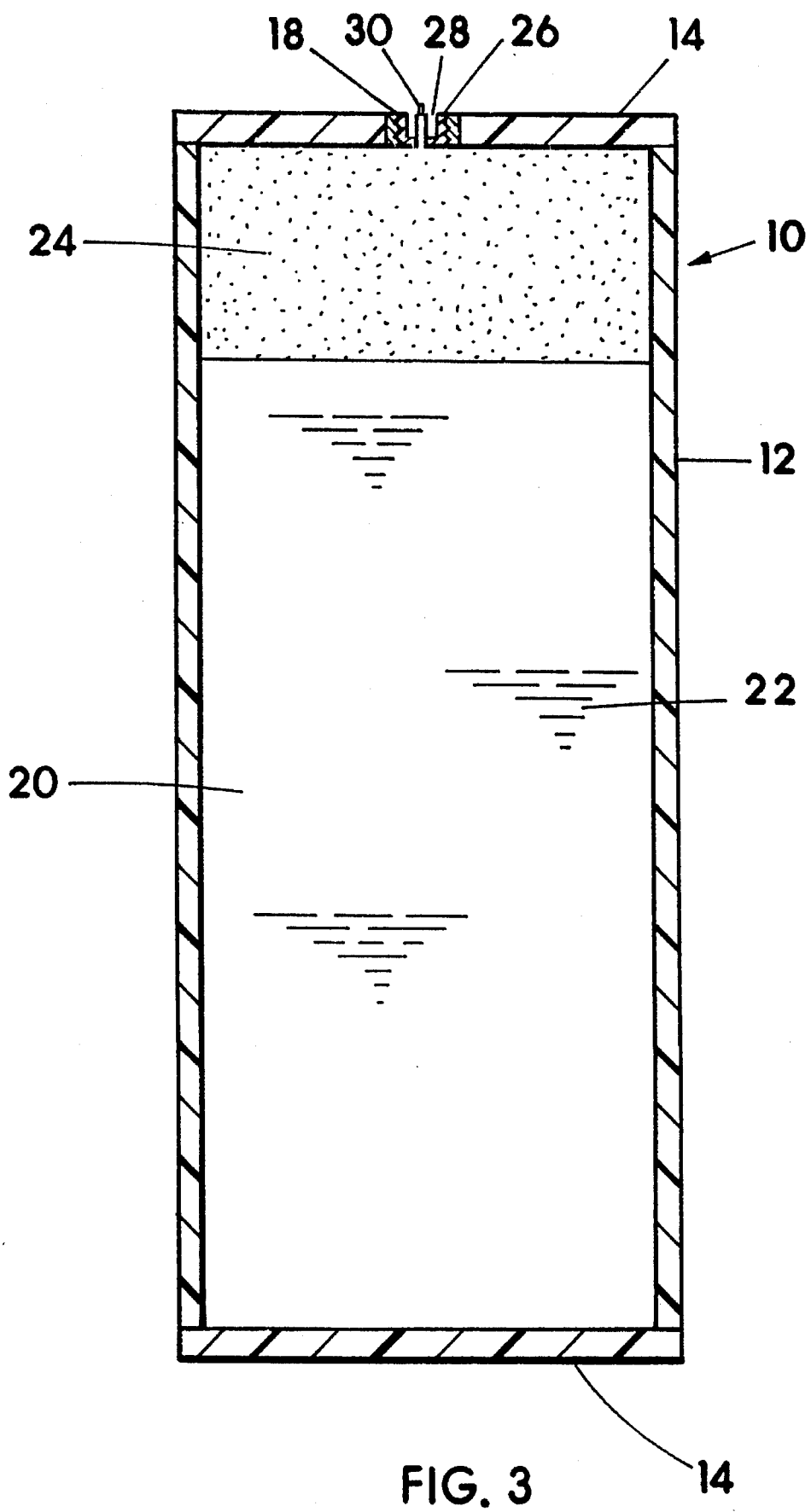
FIG. 3 is a cross sectional side view of a liquid filled shaker pad in a slightly varied embodiment from that of FIG. 2 only partially filled with liquid, with an air filled space provided for liquid displacement room.

Alternatively the pad 10 functions well when chamber 20 is only partly full, although in my opinion it needs to be full a minimum of 65 percent, with air or air space 24 left in the chamber 20 when it is sealed by plug 26. In this arrangement, end walls 14 need not be capable of bowing outward to the same degree as when chamber 20 is completely full of liquid. The air in the chamber 20 being compressible will allow for the displacement of liquid 22 under clamping pressure and allow the pad to deform slightly and conform to the tree trunk. This arrangement is illustrated in FIG. 3, wherein an optional air valve 30 is also shown which would allow the adding or subtracting of air to adjust internal static pressure if desired. Air valve 30 is shown in the center of a modified plug 26. It should be noted that I have tested chamber 20 without liquid and only having air therein under various pressures, and this has not be found to be an arrangement which transmits vibration to a tree as well as does the pad 10 having a substantial volume of liquid 22.

In use, pads 10 are inserted into sling 32, one pad 10 per shaker arm 34, and one sling per pad. Slings 22 are flat rectangular flexible sections of material used to support pads 10 horizontally disposed on shaker arm 34. Sling 32 is folded or wrapped over pad 10 with the free edges brought together and affixed to shaker arm 34 generally with bolts and a connecting plate. To further help reduce damage to trees 16 by providing a slipping joint, slip pad 36, which is also made up of a rectangular section of flexible material, is affixed to the top of the shaker arm 34 and drawn over and under sling 32 and pad 10, and connected with elastic cords 38 to the bottom surface of shaker arm 34. Lubricant is applied between the slip pad 36 and the sling 32 to prevent friction and heat build up between the two members when in use, and this prevents movement in the shaker arm, shaker pad and retaining sling from being translated in tree damaging movement against the bark layers. The harvester is then ready to begin harvesting of trees 16, with little or no time expended in rotating or exchanging heated pads 10.

Although I have very specifically described the preferred structures and best modes for carrying out the invention, it should be understood that some changes in the specifics described and shown in my drawings can be made without departing from the true scope of the invention in accordance with the appended claims.

What I claim as my invention is:

1. A low heat generating shaker head assembly on an end of a shaker arm of a vibratory tree trunk shaking harvester for protecting tree bark layers and for transmitting vibration during tree shaking, said assembly comprising;

an elongated main pad lengthwise generally horizontally disposed on the shaker arm, said pad being of a length equal to at least 14 inches so as to be sufficiently long to span at least a small tree trunk diameter, said pad generally comprising an elongated annular main body wall having two oppositely disposed ends with each of the ends sealingly capped by end walls, one end wall affixed at each of said oppositely disposed ends;

said annular main body wall defined of durable materials providing the body wall with flexibly resilient characteristics;

each of the end walls defined of durable materials providing the end walls with flexibly resilient characteristics;

a sealed interior chamber defined between the end walls and the annular main body wall;

said chamber having a cross-sectional diameter equal to at least 50 percent of the cross-sectional exterior diameter of said pad;

a removable plug sealingly affixed within an opening through one of the end walls, said plug and opening providing an openable and resealable access into said chamber;

a substantially non-compressible liquid within said chamber and substantially filling the chamber;

liquid displacement allowing means cooperatively operable with said flexibly resilient characteristics of said annular main body wall and the end walls allowing for limited deformation of the liquid filled main pad when pressed against a tree during tree shaking;

a flexible retaining sling member wrapped around said main pad and removably attached to the shaker arm and retaining said main pad on said shaker arm within the wrap of the retaining sling;

slippage providing means for substantially preventing movement in said shaker arm from translating into tree injurious movement against a tree during tree shaking.

2. A low heat generating shaker head assembly according to claim 1 wherein said liquid is substantially comprised of water.

3. A low heat generating shaker head assembly on an end of a shaker arm of a vibratory tree trunk shaking harvester for protecting tree bark layers and for transmitting vibration during tree shaking, said assembly comprising;

an elongated main pad lengthwise generally horizontally disposed on the shaker arm, said pad being of a length equal to at least 14 inches so as to be sufficiently long to span at least a small tree trunk diameter, said pad generally comprising an elongated annular main body wall having two oppositely disposed ends with each of the ends sealingly capped by end walls, one end wall affixed at each of said oppositely disposed ends;

said annular main body wall defined of durable materials providing the body wall with flexibly resilient characteristics;

each of the end walls defined of durable materials providing the end walls with flexibly resilient characteristics;

a sealed interior chamber defined between the end walls and the annular main body wall;

a liquid within said chamber and filling at least 65 percent of the chamber;

liquid displacement allowing means cooperatively operable with said flexibly resilient characteristics of said annular main body wall and the end walls allowing for limited deformation of the liquid filled main pad when pressed against a tree during tree shaking;

attachment means retaining said main pad on the shaker arm;

slippage providing means for substantially preventing movement in said shaker arm from translating into tree injurious movement against a tree during tree shaking.

4. A low heat generating shaker head assembly according to claim 3 wherein said liquid is substantially comprised of water.

5. A low heat generating shaker head assembly on an end of a shaker arm of a vibratory tree trunk shaking harvester for protecting tree bark layers and for transmitting vibration during tree shaking, said assembly comprising;

an elongated main pad lengthwise generally horizontally disposed on the shaker arm, said pad being of a length sufficient to span at least a small tree trunk diameter, said pad generally comprising an elongated annular main body wall having two oppositely disposed sealingly closed ends;

said annular main body wall defined of durable materials providing the body wall with flexibly resilient characteristics;

a sealed interior chamber within said pad;

a liquid within said chamber and filling at least 65 percent of the chamber;

liquid displacement allowing means cooperatively operable with said flexibly resilient characteristics of said annular main body wall and the end walls allowing for limited deformation of the liquid filled main pad when pressed against a tree during tree shaking;

attachment means retaining said main pad on the shaker arm;

slippage providing means for substantially preventing movement in said shaker arm from translating into tree injurious movement against a tree during tree shaking.

6. A low heat generating shaker head assembly according to claim 5 wherein said liquid is substantially comprised of water.

* * * * *